Nov. 2, 1954 H. Q. NORTH ET AL 2,693,555

METHOD AND APPARATUS FOR WELDING GERMANIUM DIODES

Filed April 4, 1951 3 Sheets-Sheet 1

INVENTORS
HARPER Q. NORTH.
SANFORD H. BARNES.
JACK F. ROACH.
BY Nicholas T Volk
atty Nov. 2, 1954 H. Q. NORTH ET AL 2,693,555

METHOD AND APPARATUS FOR WELDING GERMANIUM DIODES

Filed April 4, 1951 3 Sheets-Sheet 2

INVENTORS.
HARPER Q. NORTH.
SANFORD H. BARNES.
JACK F. ROACH.
BY Nicholas T. Volsk
atty Nov. 2, 1954 H. Q. NORTH ET AL 2,693,555

METHOD AND APPARATUS FOR WELDING GERMANIUM DIODES

Filed April 4, 1951 3 Sheets-Sheet 3

INVENTORS.
HARPER Q. NORTH
SANFORD H. BARNES
JACK F. ROACH

BY Nicholas T Volsk
atty.

United States Patent Office 2,693,555

Patented Nov. 2, 1954

2,693,555

METHOD AND APPARATUS FOR WELDING GERMANIUM DIODES

Harper Q. North and Sanford H. Barnes, Los Angeles, and Jack F. Roach, Van Nuys, Calif., assignors, by mesne assignments, to Hughes Aircraft Company, a corporation of Delaware Application April 4, 1951, Serial No. 219,218

20 Claims. (Cl. 317—236)

The present invention relates to germanium crystal devices and more particularly to germanium crystal devices mounted in sealed vitreous envelopes and improved methods of making the same.

In U. S. patent application Serial No. 153,102, filed March 31, 1950, for "Glass-Sealed Semi-Conductor Crystal Devices" by Harper Q. North and Justice N. Carman, Jr., there is set forth a method of making germanium crystal devices mounted in sealed vitreous envelopes. In this method, the crystal and a lead wire are integrated into a single structure by means of a positive rigid conducting vitreous bond. According to the method of the above-identified application, a lead wire, preferably composed of "Dumet," is provided with a glass bead thereover, the combination being heated and subsequently annealed for sealing the bead to wire. The upper end of the bead and the protruding portion of the wire are then ground off square and polished. The exposed portion of the wire is then copper-plated.

The germanium crystal is prepared for integration with the lead wire by polishing the flat surfaces or faces and then copper-plating and silver-plating one face thereof. The copper layer is provided to establish an excellent mechanical and electrical bond between the germanium crystal and the silver layer. The silver layer establishes an equally good bond between the copper layer and an electrically conductive vitreous bond, as set forth below.

To produce the vitreous bond, a "silver paste" is applied to the copper plating on the wire and to the polished surface of the glass bead. The crystal is then mounted on the silver paste, and these elements are then coated with a low melting point glaze. The glaze and paste then are vitrified simultaneously in an oven, and the upper portion of the glaze is removed in order to expose that surface or face of the crystal which is to be used in the germanium crystal devices, such as the surface to be engaged by the pointed electrode or cat-whisker of the germanium diode.

A vitreous envelope, in the form of a cylinder, is then slipped over the entire assembly and fused or coalesced to the glass bead by means of radiant energy heating. The entire assembly is annealed and the exposed surface of the germanium crystal is electrolytically cleaned and polished. The assembly is then ready to receive the cat-whisker, which has been spot-welded to another dumet wire having another glass bead fused thereover. The remaining steps in the assembling of the diode are the welding of the cat-whisker to the exposed surface of the crystal, and the fusing of the envelope to the last-mentioned glass bead.

Although the method outlined above produces an eminently satisfactory germanium crystal device, many of the steps thereof require a high degree of precision, are time-consuming, and therefore, are costly. Furthermore, since the vitreous bond establishes a direct connection between the envelope and the crystal, the heat energy applied to the envelope during the final fusing will be conducted to the crystal and may adversely affect the characteristics of the crystal. Accordingly, if the lead wire could be connected directly to the crystal, many of the steps outlined above, and the time consumed thereby, would be eliminated. In addition, the direct connection would eliminate the vitreous conductive bond between the crystal and the envelope.

In considering the feasibility of connecting the lead wire directly to the crystal, it should be recognized that the joint formed must meet certain operating requirements. This joint, however formed, must be capable of withstanding temperatures within the range of —50° C. to 550° C., must have a low electrical resistance and must be substantially non-rectifying, that is of substantially equal electrical conductivity in either direction. In addition, the joint must be capable of withstanding extreme mechanical tests.

Thus, brazing or hard soldering the lead wire to the crystal offers little possibility of success, since any connection so produced will not be malleable enough to prevent cracking caused by the wide difference in expansion of the two materials and will not meet the stringent mechanical requirement outlined above. Soft soldering would result in a connection having a melting point of approximately 230° C., far below the maximum temperature requirement.

Accordingly, if a satisfactory direct connection between the lead wire and the crystal is to be obtained, it preferably should be formed by some form of welding, since such connection would be most economical to make and would be most suitable for mass production mechanical methods. Welded joints between a cat-whisker and a germanium crystal have been obtained before, as described in "Properties of Welded Contact Germanium Rectifiers," Journal of Applied Physics, vol. 17, pp. 912–923, November 1946.

As described in the above publication, the cat-whisker is welded to the face of a germanium crystal by passing direct or alternating current between the two. However, in the known method, the cat-whisker has a diameter of 0.0015", and is sharpened to a point of 0.0002" radius. Therefore, the welded area is of the order of 0.0000001 square inch. Because of extremely small area, currents of the order of only 250–400 milliamperes are necessary for establishing the welded connection, the limit of the range being determined by the resultant heating of the conical portion of the cat-whisker. The crystal element is of subtantially cubical form with the side of the cube being of the order of 0.03". Therefore, a cat-whisker having an area of 0.0000001 square inch is welded to the germanium cube whose surface, facing the cat-whisker, has a maximum area of 0.002 square inch. Thus, the available area of the crystal is 20,000 times greater than the contact area of the whisker. Since the whisker has the lesser heat capacity, the primary consideration in obtaining a satisfactory weld between the whisker and the crystal resides in not overheating the conical portion of the whisker. On the other hand, in the instant case, the conditions are such that the area of the wire to be welded to the crystal is comparable to the available area of the crystal. All prior attempts to make a weld between the two elements, under these conditions, have produced either shattering, melting, or cracking of the crystal. For this reason, it generally has been considered that a satisfactory weld between a lead wire and the crystal could not be obtained.

In the cat-whisker weld, the resulting contact exhibits asymmetrically conducting properties and constitutes the rectifying contact of the germanium crystal device. On the other hand, the welded contact of this invention must be substantially symmetrically conducting, in order that the over-all rectifying characteristics of the crystal device be substantially the same as that of the rectifying contact. Similarly, where the crystal element includes an internal rectifying barrier or boundary, the welded contact of this invention must have sufficiently high conductivity in either direction so as to be virtually ineffective to alter the over-all rectifying characteristics of the crystal device. Stated differently, although the welded contact of this invention may exhibit slight rectifying properties when considered alone, the extent of these properties must be such as to render the contact substantially non-rectifying when compared with the rectifying characteristics of the conventional rectifying boundary of the crystal device. Accordingly, the welded contact of this invention must function in a manner directly opposite to that of the cat-whisker weld.

The disclosed method of welding a lead wire to the crystal includes novel techniques which successfully solve many of the difficulties which prevented obtaining such a weld in the past. According to the present invention, the sides of the crystal are surrounded by a good conductor for establishing an electrical contact with the crystal during the welding operation. By thus avoiding the use of the rectifying face of the crystal or, in other words, the crystal face opposite to the face used for obtaining the weld, destruction of the rectifying surface of the crystal during the welding operation by shattering, melting, or cracking can be prevented. The conductor, utilized for contacting the sides of the crystal acts as a large reservoir for absorbing heat from the main body of the crystal without such cooling of areas between the lead wire and the crystal as to prevent deformation of the desired weld. Moreover, the current for producing welds has been directed from the center of the available area to the outer periphery of the crystal, with the result that heating of the opposite surface of the crystal is eliminated for all practical purposes. Accordingly, although high temperatures are obtained at the point of contact of the lead wire, the high temperature is confined in the main to the area of contact. The above method prevents not only the destruction of the entire crystal, but also the destruction of the rectifying surface of the crystal, which remains unmolested during the welding operation. As stated above, in the prior art, the current was conducted from the face of the crystal adjacent the lead wire to the face of the crystal used for rectification. This prior art procedure resulted in the latter face being raised to such a high temperature as to transform the crystal in to a molten mass, thus destroying the rectifying properties of the crystal.

The method of producing the desired weld also discloses a technique which permits the highly localized heating of the crystal and permits the insertion of the lead wire into the crystal only after this highly localized heating melts a very minute portion of the crystal volume. The wire is inserted into the molten portion of the crystal rather than the solid portion of the crystal, with the result that the crystal is not strained mechanically during the welding operation. The latter step is accomplished by imparting a wedge-shape to the end of the lead wire. The wedge-shape not only produces sufficiently high initial resistance for highly localized heating and melting of the crystal, but also enables one to insert the wire into the molten mass of the crystal without producing the previously mentioned mechanical strain. The resultant weld had a sufficiently large area to exhibit substantially equal conductivity in either direction, which is essential for functioning of the crystal-lead wire combination as one electrode of the diode, as pointed out above.

This novel method of forming the direct connection between the lead wire and the crystal enables the reduction in the number of steps and the time consumed in forming the crystal device. In addition, since the crystal is now directly secured to the lead wire, when the vitreous envelope is fused to the bead on the lead wire, no vitreous bond will be created between the crystal and the envelope. In this manner, a relatively high resistance heat path will exist between the crystal and the envelope, and any subsequent heating of the envelope will not adversely affect the crystal.

Finally, the present invention discloses modified methods of applying the bead to the lead wire and of fusing the envelope to the bead, so that the bead may be applied either before or after the weld with equally satisfactory operation.

Although the invention will be described with particular reference to germanium diodes, it should be understood that it is equally applicable to other germanium crystal devices, such as transistors, photo-transistors, Hall-effect devices, and P—N junction diodes. Illustrations of these applications of germanium crystals may be found in the above-identified application.

It is, therefore, an object of the present invention to provide a germanium crystal device having a direct connection between a lead wire and one face of the crystal.

A further object of the present invention is to provide a germanium crystal device having a lead wire welded directly to one face of the crystal.

Another object of this invention is to provide a welded connection between a lead wire and a germanium crystal which possesses an excellent mechanical bond and exhibits substantially equal electrical conductivity in both directions therethrough.

A still further object of this invention is to provide a welded joint between a lead wire and a germanium crystal which is physically strong and has a high melting point, with the rectifying surface of the crystal being unimpaired in the course of obtaining this joint.

Still another object is to provide a germanium crystal device mounted in a sealed vitreous envelope spaced from and not directly connected to the crystal.

An additional object is to provide a germanium crystal device having a germanium crystal mounted within and spaced from a glass envelope, the envelope being sealed by means of glass seals and glass-to-metal meals.

A further object of the invention is to provide a novel method of making germanium crystal devices including directly connecting a lead wire to the crystal, and mounting the crystal within a sealed vitreous envelope spaced from the crystal.

Still another object of the present invention is the provision of a method of welding a lead wire directly to a germanium crystal.

A still further object is to provide a method of welding a lead wire directly to a germanium crystal and subsequently fusing a glass bead thereover.

An additional object is to provide an apparatus for welding a lead wire directly to a germanium crystal.

A still further object is to provide an apparatus for welding a lead wire directly to a germanium crystal and subsequently fusing a glass bead over the crystal.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Fig. 1 is a schematic diagram of one form of apparatus for performing the welding and fusing operations of the present invention;

Figs. 1*a*, 1*b*, and 1*c* are diagrams similar to Fig. 1 illustrating the positions of the apparatus during the various stages of operation;

Figures 1, 1A, 1B, 1C:
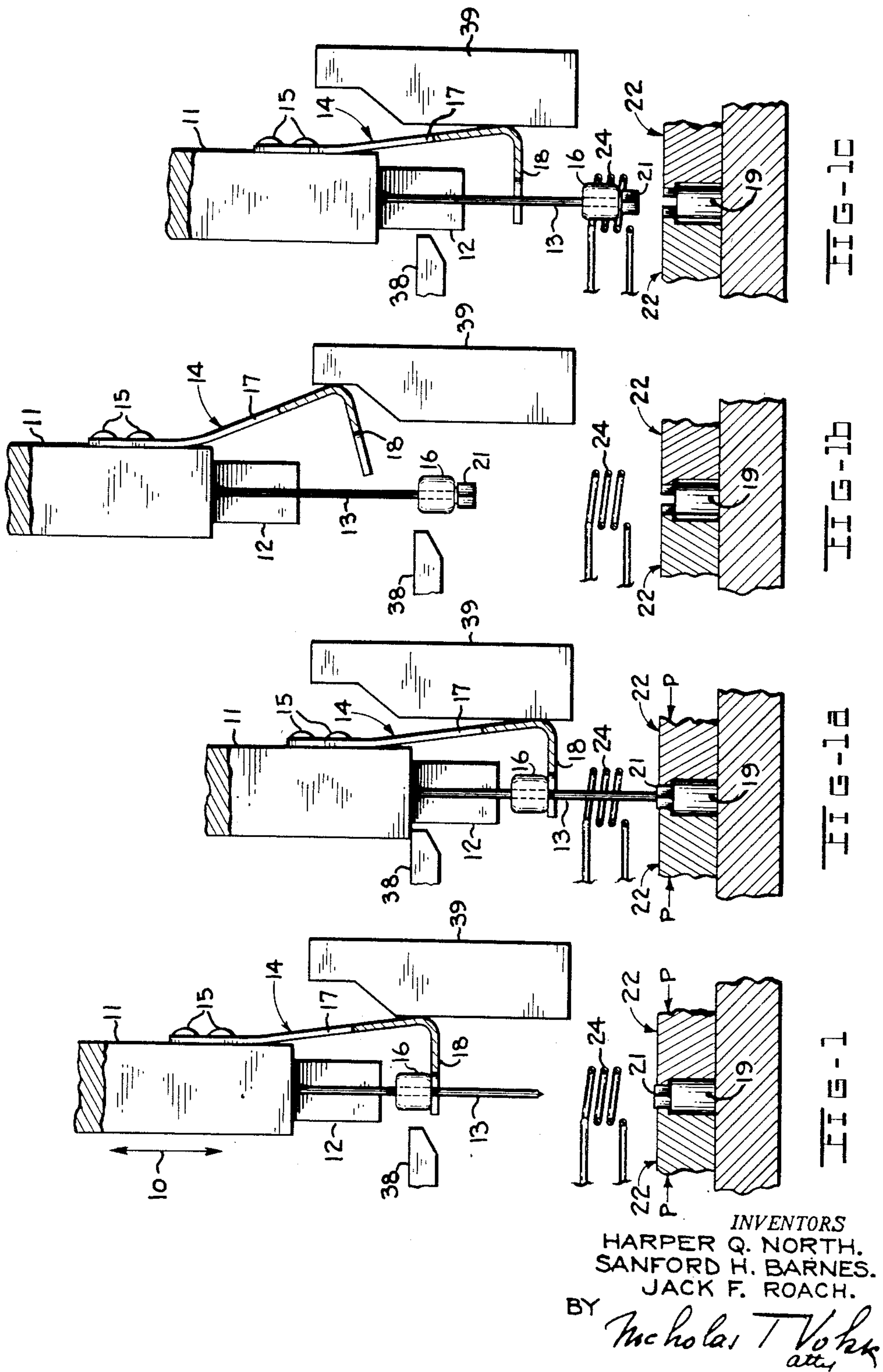

Referring now to the drawings, wherein like reference characters designate like or corresponding parts throughout the several views, there is shown in Fig. 1 one form of apparatus for performing the welding and beading operation of the present invention. This apparatus comprises a shaft 11 axially translatable in either direction, as indicated by a double-headed arrow 10, by any suitable means, not shown. Secured to shaft 11 and extending axially downward therefrom is a lead wire chuck 12. Chuck 12 may be any suitable means for centering and retaining lead wire 13 along the axis of shaft 11. Thus, chuck 12 may be a plurality of permanent magnets, if "Dumet" or other magnetic materials are used for lead wire 13, or a grooved block having clamping means thereon.

A bead retainer 14 is mounted on shaft 11 by any suitable means, such as bolts 15. The purpose of retainer 14 is to retain a glass bead 16 in axial alignment with lead wire 13 during the loading and welding operation and to release bead 16 over wire 13 for the fusing operation. In the particular form illustrated, retainer 14 is a flexible member having a portion 17 extending downwardly and outwardly of shaft 11 and an integral horizontally extending portion 18. Portion 18 has its free end positioned behind and adjacent to lead wire 13 so that bead 16 may be slipped over wire 13 and rest upon portion 18, as shown in Fig. 1.

Figure 2:
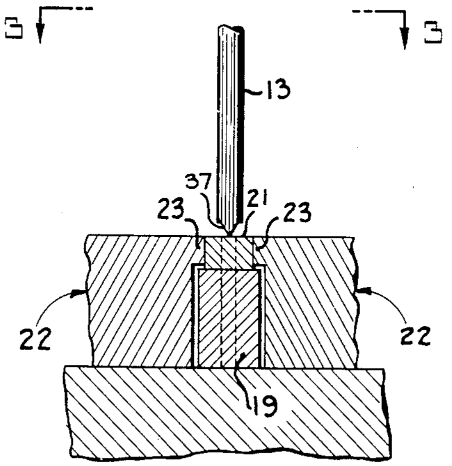
Fig. 2 is a fragmentary side elevational view, partly in section, of the crystal support, illustrating the positions of the lead wire and the crystal.
Figure 3:
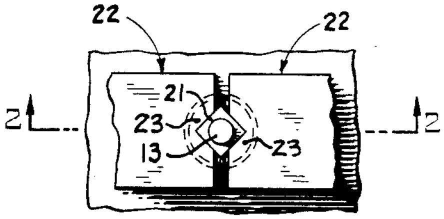
Fig. 3 is a top plan view of the apparatus shown in Fig. 2.

Positioned beneath and in axial alignment with shaft 11 is a crystal support 19. Support 19 is composed of electrically insulating material, such as "Lavite," and is adapted to support crystal 21 on one of its faces. As shown in Figs. 1 and 2, crystal 21 rests upon the upper surface of support 19 and is retained in position on support 19 by means of movable conductive members 22. As shown in Figs. 2 and 3, members 22 are spaced from support 19 and have their upper portions 23 extending horizontally inwardly toward the crystal. The free end of portion 23 of each member 22 has a central triangular cut-out for engaging one corner of crystal 21.

Figure 5:
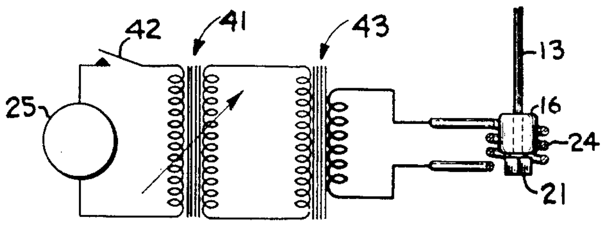
Fig. 5 is a schematic diagram of one form of fusing circuit.

A heating coil 24 is positioned between shaft 11 and support 19 and coaxial therewith. Heating coil 24 is connected to a source of current 25, as shown in Fig. 5, for fusing bead 16 to crystal 21, as set forth below.

In operation, crystal 21 is placed on support 19 and members 22 are moved inwardly until they firmly engage crystal 21. Bead 16 is slipped over lead wire 13 and wire 13 is then placed in holder 12, bead 16 being retained in position above the end of wire 13 by means of portion 18 of retainer 14. Shaft 11 is then moved downwardly until the end of wire 13 contacts the upper face of crystal 21. In this position, as shown in Fig. 1*a*, the apparatus is now ready for the welding operation.

Figure 4:
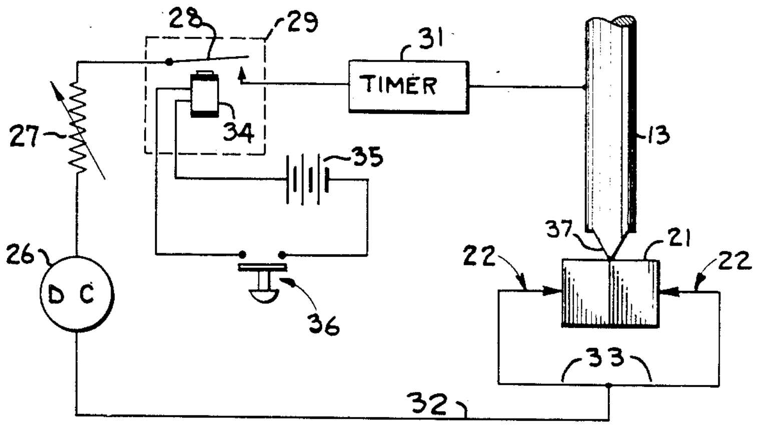
Fig. 4 is a schematic diagram of one form of welding circuit according to the present invention.

Referring now to Fig. 4, there is shown one circuit for supplying the welding current. As shown in Fig. 4, the free end of wire 13, that is the end of wire 13 not in contact with crystal 21, is connected to one terminal of a source of current 26, preferably of direct current, by means of a series circuit comprising variable resistor 27, movable armature 28 of a relay 29, and a timer 31. The other terminal of source 26 is connected to each of conductive members 22 by means of conductor 32 and conductors 33. It is thus seen that members 22 constitute electrodes connected to crystal 21 during the welding operation.

Control of the welding current is attained by means of control of the energization of coil 34 of relay 29 from a suitable source of potential, such as battery 35, by a manually operable member, such as push-button 36.

In operation, actuation of push-button 36 causes energization of coil 34 of relay 29 which moves armature 28 to its circuit closing position. This, in turn, completes the circuit from source 26 through lead wire 13 and crystal 21. The magnitude of the current supplied to wire 13 and crystal 21 is controlled by variable resistor 27.

The duration of the current flow is controlled by timer 31, which may be any conventional automatic timing device for breaking either the circuit through coil 34 or the circuit through resistor 27. In either case, disruption of the circuit removes source 26 from the welded contact. It is to be understood, of course, that the welding circuit shown in Fig. 4 is merely illustrative, and that any circuit for supplying a welding current variable in magnitude and duration is contemplated by the present invention. Thus, if the contacts of timer 31 will not pass sufficient current, it may be placed in a separate control circuit.

Considering now the magnitude and the duration of the welding current, the condition of the weld is a function of the product of the magnitude of the current and the duration of application thereof. It has been demonstrated that for "Dumet" leads having a diameter of the order of 0.020 inch and crystals having dimensions of the order of 0.03 inch by 0.04 inch by 0.04 inch, consistently satisfactory welds require a current of between 23 and 30 amperes for a period of between one-half and one-third of a second. Currents in excess of 30 amperes are likely to cause blow-out or vaporization of the crystal. Currents of less than 23 amperes are insufficient to yield consistently satisfactory welds and require a length of time of application too great for production methods. Furthermore, decreasing of the current utilized beyond the above range eventually results in the production of insufficient heat to melt the crystal even if the duration of application thereof is extended beyond the critical range.

Considering next the configuration of electrodes 22, it has been found that melted germanium exhibits properties different from those found in the original crystalline structure. One essential difference is that melted germanium is unsuitable for rectification. Thus, one of the basic uses of germanium crystal devices, namely as a diode, would be eliminated if the melted germanium was found on the rectifying surface of the crystal.

If the high current is permitted to flow through the entire crystal, part of the melted portion appears on the rectifying face of the crystal or the face opposite the face contacted by the lead wire. Although not all of the characteristics of this melted portion have been ascertained, X-ray diffraction patterns indicate that it is germanium of a crystalline structure no different from that of the original crystal. Its low resistivity is possibly caused by the presence of oxygen in sufficient quantity to destroy rectification, which impurity may be removed by welding in an inert atmosphere. In any case, this melted portion possesses poor rectification properties, as pointed out above.

With this melted portion extending to the rectifying face of the crystal, it is clear that only a limited area of the face may be used for rectification. Furthermore, in automatic assembly of germanium diodes, it is virtually impossible to select the particular area of the face of the crystal to which is to be secured the other element of the diode, commonly termed the whisker. If the whisker is in contact with, or is attached to the melted portion, the diode will be inoperative.

Accordingly, in order to prevent the melted portion of the crystal from appearing on the rectifying face of crystal 21, electrodes 22 are designed so that the welding current does not flow through this face, but flows through the sides of crystal 21. Thus, referring again to Figs. 2 and 3, electrodes 22 are spaced from support 19, and portions 23 of electrodes 22 do not extend along the entire height of the sides of crystal 21, but terminate short of the lower face thereof. In this manner, the welding current passes through the upper face of crystal 21 and through the sides of crystal 21, thereby substantially eliminating heating of the lower face of crystal 21. Furthermore, as pointed out above, electrodes 22 act as large reservoirs for absorbing heat from the main body of crystal 21.

As shown in Fig. 2, the end of lead wire 13 contacting the upper face of crystal 21 is not ground off flat, but is preferably in the form of a taper, as shown in 37 in Fig. 2. This procedure produces sufficiently high initial electrical resistance at the contact area of lead wire 13 and crystal 21 to permit highly localized heating and melting of crystal 21. Furthermore, by this procedure, wire 13 is inserted into the molten portion of crystal 21, rather than the solid portion of crystal 21, with the result that crystal 21 is not strained mechanically during the welding operation.

The taper used in the production of the welds is not critical and may be produced in any manner. Thus, the lead may be pointed by grinding, or may be provided with a knife edge by shearing. In actual practice, the knife-edge formed when the lead is sheared off to the desired length has proved satisfactory.

As pointed out above, one of the important factors in obtaining a satisfactory weld is the amount of penetration of lead wire 13 into crystal 21: with too little penetration the strength of the weld is insufficient; while too great a pentration causes cracks in the crystal. For the crystal and lead wire of the dimensions stated, a penetration of 0.005 inch has produced consistently good welds without adversely affecting the machanical strength or the electrical properties of the crystal.

The amount of penetration may be controlled in several ways. Firstly, downward pressure may be applied to lead wire 13 or by the weight of shaft 11. In the form of apparatus illustrated in Fig. 1, the pressure results from the weight of shaft 11.

Secondly, lead wire 13 has limited downward movement in order to limit the penetration to 0.005 inch. This limitation may be accomplished by a stop 38, Figs. 1 and 1*a*, which engages shaft 11 when lead wire 13 has penetrated crystal 21 the desired depth. Furthermore, the depth of penetration may be limited by limiting the duration of application of the welding current. Thus, it has been found that, with a current of 30 amperes, a time interval of 25/60 second will produce a penetration of 0.005 inch.

After the welding operation is completed, shaft 11 is raised to the position shown in Fig. 1*b*, in order to permit bead 16 to drop over crystal 21. As shown in Fig. 1*a*, bead 16 is retained in position during the welding operation with the aid of member 39 which maintains retainer 14 in the position shown. However, upon upward movement of shaft 11, retainer 14 is permitted to move into the position shown in Fig. 1*b*, thereby releasing bead 16 and permitting it to drop over crystal 21.

Shaft 11 is then lowered to the position shown in Fig. 1*c*, wherein crystal 21 and bead 16 are positioned within coil 24. The apparatus is now ready for the fusing of bead 16 to lead wire 13.

Fusing of bead 16 over lead wire 13 is accomplished by supplying sufficient current to coil 24 from any suitable source 25, and by radiating heat from coil 24 toward bead 16, the level of radiation being sufficiently high to produce fusing. One convenient form of bead fusing circuit is illustrated in Fig. 5, in which source 25 is connected to the primary of a variable transformer 41 by means of switch 42. The secondary of transformer 41 is coupled to the primary of step-down transformer 43 whose secondary is connected to coil 24. In actual practice, in order to raise bead 16 to a temperature of 700° C. to 800° C., a coil having an inside diameter of 0.110 inch, has applied thereto from source 25, a potential of 60 volts and a current of 14.5 amperes for a time interval of 13 seconds to heat coil 24 to a temperature of approximately 1400° C. during the fusing operation.

It is thus seen that the present invention provides a method and apparatus for satisfactorily welding the lead wire directly to the face of the germanium crystal, contrary to the general conclusions of the prior art that welding a lead wire of the specified dimensions to a crystal of comparable dimensions was impossible. Stated differently, the present invention discloses a method and apparatus for successfully welding a lead wire to a face of a germanium crystal, where the diameter of the lead wire is equal to $l(10)^{-k}$ inches, and the thickness of the crystal is substantially equal to $m(10)^{-k}$ inches, where $k$, $l$, and $m$ are decimal digits. Furthermore, the area of the weld produced is substantially equal to $n(10)^{-p}$ square inches, while the area of the face of the crystal is substantially equal to $r(10)^{-p}$ square inches, where $n$, $p$ and $r$ are decimal digits. The result is accomplished by the regulation of the magnitude and duration of the welding current, the depth of penetration of the lead wire into the crystal, and the path of current flow through the crystal.

The weld produced according to the present invention is an excellent mechanical and electrical bond which exhibits substantially equal conductivity in both directions. Tensile strength tests of the weld have resulted in rupture of the crystal prior to any destruction of the weld. In addition, the combination of the lead wire and the crystal at the weld, which is probably an alloy of germanium, nickel, and iron, has a melting point well in excess of the temperatures encountered in fusing the bead to the lead wire or in any of the other heating operations generally performed in germanium crystal device construction.

Although reference has been made only to "Dumet" leads, it has been found that lead wires of other compositions may be welded to germanium crystals with equal success. Thus, both iron and "cupron" leads have been welded to germanium crystals with satisfactory results.

Figure 6:
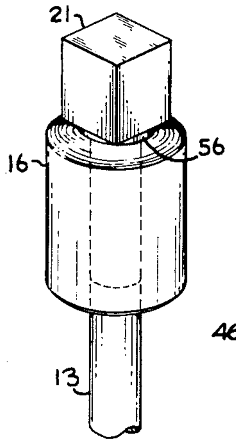
Fig. 6 is a perspective view of the crystal device after completion of the welding and fusing operations.
Figure 7:
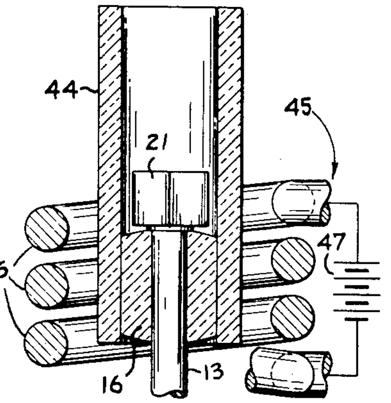
Figs. 7 through 11 illustrate the crystal diode during various stages of its assembly.

The combination of lead wire 13, bead 16 and crystal 21, formed by the welding and fusing operations of the present invention is illustrated in Fig. 6. The next step in the method of making the germanium crystal device of the present invention is the sealing of a vitreous envelope in the form of a cylinder 44 to bead 16, as illustrated in Fig. 7. Cylinder 44, which is preferably made of glass, is 0.2″ long, and has inside and outside diameters of 0.06″ and 0.09″, respectively, and is slipped over bead 16 with which it forms a sliding fit. In actual practice bead 16 is cylindrical in form having an outer diameter of approximately 0.058″, and a length of the order of 0.062″, while the inner diameter of cylinder 44 varies between 0.058″ and 0.062″. In this manner, a close fit may be obtained between bead 16 and cylinder 44. The actual sealing operation is accomplished by means of a source 45 of radiant energy for fusing or coalescing of cylinder 44 to bead 16.

As shown in Fig. 7, source 45 comprises a heating coil 46 connected to a suitable source 47 of electrical energy for raising the temperature of coil 46 to a value sufficient to soften cylinder 44 and bead 17 and to fuse these elements to each other. Coil 46 is composed of any suitable high resistance wire, such as nickel-iron alloys, or platinum alloys of ruthenium, indium or rhodium. Where platinum alloys are utilized, care must be taken to avoid evaporation of the platinum and later condensation on the outer wall of cylinder 44 when coil 46 is raised to its operating temperature. This may be accomplished by imbedding coil 46 in an insulating hollow cylinder, not shown.

In the preferred arrangement of coil 46 and cylinder 44, the inner diameter of coil 46 is such that coil 46 is as close to cylinder 44 as practical mechanical tolerances permit, without actual touching of the elements. The softening temperatures of bead 16 and cylinder 44 are of the order of 630° C., and heating of coil 46 to a temperature of the order of 1300° C. will cause the extreme lower portion of cylinder 44 to soften and fuse or coalesce to bead 16 in about 40 seconds from the time of application of source 47 to coil 46.

The crystal-envelope assembly, that is the crystal, lead wire and cylinder combination, is then transferred into an annealing oven, not shown, where it is heated for two hours or more at 550° C. and cooled slowly to room temperature. This anneal is utilized to remove lattice distortions in the crystal which nullifies the P-type tendencies which may arise because of such lattice distortions. The P-type tendencies which may be present in unannealed germanium are clearly detrimental to N-type rectification.

Figure 8:
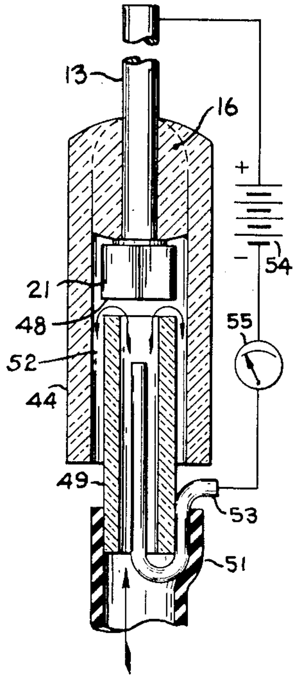

In order to give surface 48 of crystal 21 the necessary and optimum rectifying properties, crystal 21 is subjected to an electrolytic cleaning and treating process which may also be referred to as etching or electrolytic polishing. This etching process is performed in the manner illustrated in Fig. 8, in which the etchant is introduced through a fine glass tube 49 connected to a rubber hose 51, which in turn is connected to a reservoir, not shown, containing the etching solution of 2% phosphoric acid. The phosphoric acid solution is furnished through hose 51 at the rate of about 5 cc. per minute. Tube 49 has an inner diameter of 0.020″ and an outer diameter of approximately 0.050″, so that toroidally-shaped clearance 52 exists between tube 49 and the inner wall of glass cylinder 44. The clearance between the upper end of tube 49 and crystal 21 is of the order of 0.010″. The phosphoric acid rises in glass-tube 49, as illustrated by the arrows, comes in contact with crystal surface 48, and then discharges through the toroidal passage 52. Since the position of germanium on the electro-positive element scale is not sufficiently high to produce a reaction with a 2% solution of phosphoric acid at room temperatures, it becomes necessary to force this reaction by impressing positive potential, in the indicated manner, on surface 48 of the crystal. The end product, soluble in the solution, is carried away by the stream of electrolyte. To accomplish this, a conductor 53 is connected to the negative pole of a direct current source 54 through meter 55, while the positive terminal is connected to wire 13 which now makes electrical connection with the surface 48 of the crystal. The etching period is of the order of one minute with a current of approximately 20 milliamperes.

It is found that the above treatment adequately removes germanium oxide layer formed on all surfaces of the crystal during the welding and sealing operations, leaves the surface clean, removes any stressed layer formed in the cutting and grinding of the crystal to its proper shape, and in the sealing of the crystal within the glass envelope. The surface is made bright and frequently takes on a high polish. Either condition is usually concomitant with good rectification. The final test of any surface is of course electrical. Good electrical characteristics are the final criterion of the state of the surface.

Although, in the method of the above-identified application, a vitreous bond was applied between the crystal and the cylinder to protect the electrical connection between the crystal and the lead wire during the etching process, in the method of this application, no such bond is present. The elimination of this bond, in addition to eliminating the steps connected with its formation, has the distinct advantage of reducing the high heat conductivity path between the crystal and the cylinder. Thus, in any subsequent heating of cylinder 44, as set forth below, little or no heating, and little or no damage, to the crystal will result.

During the process of welding lead wire 13 to crystal 21, a flash is formed on the surface of crystal 21 adjacent lead wire 13, the flash being material expelled from the joint formed by the welding process. This flash, designated 56 in Fig. 6, prevents bead 16 from resting directly on the surface of crystal 21 during the bead fusing operation. Accordingly, in the assembled unit, as shown in Fig. 6, bead 16 will be spaced from the surface of crystal 21, and after the cylinder sealing operation, as shown in Fig. 7, no direct connection will exist between cylinder 44 and crystal 21. In practice, the spacing between crystal 21 and bead 16, due to the flash, will vary between 0.005" and 0.010".

It would appear that the electrolytic reaction occurring during the etching operation would serve to deteriorate the welded connection and to corrode the portions of lead wire 13 and crystal 21 adjacent this connection. However, in actual practice, virtually no deterioration occurs, and, to the limited extent that any corrosion may occur, it is restricted only to partial removal of the flash.

It is considered that this lack of corrosion and deterioration results from the fact that insulating bubbles of hydrogen, liberated during the early part of the electrolytic reaction, form a protective layer about the region of the welded connection, and about the sides of crystal 21, and prevent the etchant solution from reacting with these portions of crystal 21 and lead wire 13. Thus, during the etching operation, although the etchant strikes surface 48 of crystal 21 with a relatively high velocity, it will reach the region of the welded connection, if at all, with a relatively low velocity. When the electrical potential is applied between wire 13 and conductor 53, a surge of current will pass through wire 13, along the upper surface of crystal 21 through the low resistance etchant, and back to conductor 53. The almost instantaneous electrolytic reaction resulting from the surge of current will liberate hydrogen in the region of the welded connection, and, since this liberated hydrogen remains virtually stagnant, will produce an insulating barrier around this region. The current will now pass almost entirely through crystal 21 and perform the etching of surface 48. This theory of operation has been confirmed by observation of the current flow during the etching operation, the observed result being an almost instantaneous large surge of current upon the application of the electrolytic potential, and a very rapid decrease in the current to a relatively constant value throughout the remainder of the etching operation.

Figure 9:
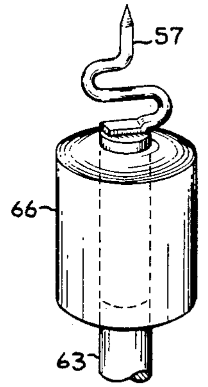

With the formation of the crystal-envelope assembly, the remaining steps in the production of a crystal diode include the formation of a whisker-lead-wire assembly, the insertion of this assembly into the envelope, the sealing of this assembly to the envelope, and the securing of the whisker to surface 48 of the crystal. The whisker-lead-wire assembly, as illustrated in Fig. 9, is formed by fusing a bead 66 over one end of a lead wire 63, and securing, preferably by spot-welding, a cat-whisker 57 to the one end of wire 63. Cat-whisker 57 is then given an S-shaped twist to provide it with the resiliency required to produce an elastic connection between lead wire 63 and crystal 21, as set forth below. In the whisker-lead-wire assembly, lead wire 63 and bead 66 are identical with their counterparts in Fig. 6. Various types of cat-whiskers are well-known in the art, and, since the particular cat-whisker and its connections form no part of this invention, no further description of this element is given here. It is to be understood, of course, that other forms of connections between lead wire 63 and crystal 21 may be used without departing from the spirit and scope of the invention.

Figure 11:
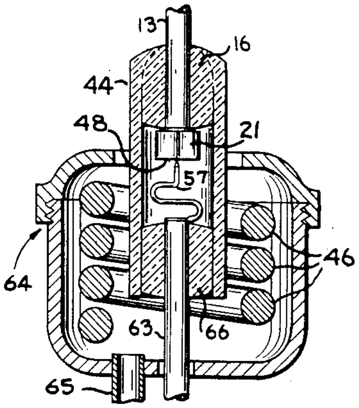
Figure 10:
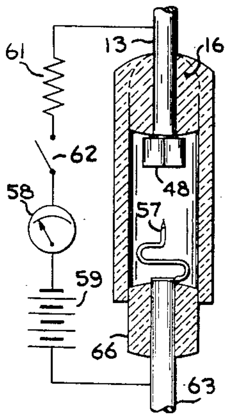

The last stages include the insertion of the whisker assembly into the germanium crystal assembly as illustrated in Fig. 10, and sealing of cylinder 44 to bead 56 in the manner illustrated in Fig. 11. Insertion of the whisker assembly into cylinder 44 includes two steps: First, making contact with the crystal 21, and second, advancing the whisker assembly approximately 0.002" in order to obtain positive contact between the whisker 57 and the crystal 21. The point of contact is determined by using a meter 58, a source of potential 59, a resistor 61, and a switch 62, the instant of obtaining contact being indicated on meter 58. Care should be taken to have sufficiently high resistance to avoid excessive heating of the crystal 21 and the whisker 57.

The method of obtaining the actual seal between cylinder 44 and bead 66 is identical to that used in sealing bead 16 to cylinder 44. This source 45 of radiant heat energy is utilized to localize the heating only to the desired portion of cylinder 44 and to permit excellent control over the quantity of heat radiated. The magnitude and duration of the current applied to coil 46 are identical to those used in connection with the sealing operation of Fig. 7. The arrangement of parts during the sealing is illustrated in Fig. 7.

It should be noted that any oxidation of crystal 21 occurring during this step cannot be removed by etching, since crystal 21 is enclosed completely in cylinder 44. Accordingly, during this sealing step, care must be exercised in preventing excessive heating of crystal 21, and particularly surface 48 of crystal 21, in order to preserve the electrical properties of the crystal. It is at this point in the method that the elimination of the vitreous bond, between crystal 21 and cylinder 44, plays the most important role. Thus, as stated above, since no direct connection exists between crystal 21 and cylinder 44, there is no low conductivity heat path between cylinder 44 and crystal 21 and little, if any, of the heat produced in cylinder 44 will reach crystal 21, and particularly surface 48, by conduction. Accordingly, even though the portion of cylinder 44 adjacent bead 66 is heated to a relatively high temperature, crystal 21 will remain at a relatively low temperature and no effective impairment of the electrical properties of crystal 21 will result.

The above procedure of obtaining the final seal is eminently successful when germanium crystal material is used. Additional precaution for prevention of surface oxidation may be desirable when other monatomic semiconductors, such as silicon, are used instead of germanium. This is obtained by surrounding coil 46 with a metal jacket 64 having a tube 65 connected to a source of helium, nitrogen, or other inert gas. A stream of this gas then envelops the entire assembly and fills glass cylinder 44, thus replacing the oxygen of the air within the envelope with an inert atmosphere. The flow of gas is continued throughout the sealing operation.

Figure 12:
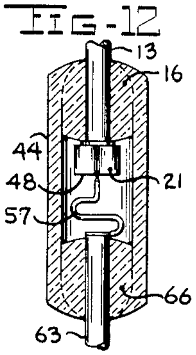
Fig. 12 is a longitudinal cross-sectional view of the completed diode.

The last step in making the diode consists of stabilizing the contact by passing a current through it which welds the cat-whisker's tip to the crystal. The same circuit may be used as that illustrated in Fig. 10 by shunting out meter 58, and adjusting resistor 61 to produce a momentary current of 350 to 400 milliamperes. Although welding of the tip to the crystal produces an electrically-stable contact area, this step is discretionary, since comparable results are obtainable by eliminating this step, or by using a pulsing process as described in "Crystal Rectifiers" by Torrey & Whitmer, M. I. T. Radiation Laboratories Series, vol. 15, pp. 370–371, McGraw-Hill Book Company, 1948. This completes the assembly of the diode, a cross-sectional view of which is illustrated in Fig. 12.

Figure 13:
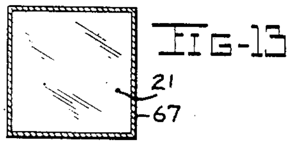
Fig. 13 is a longitudinal cross-sectional view of a modified germanium crystal element.

In the method thus far described, crystal 21 is positioned between members 22 and contacts portions 23 of members 22. Since crystal 21 is a relatively poor electrical conductor, there is a possibility of fusing crystal 21 to members 22 during the welding operation. This fusing might result if crystal 21 did not contact members 22 evenly along the entire surface of crystal 21. In order to insure good electrical contact and increased electrical conduction between crystal 21 and members 22, crystal 21 may be coated with a material having high electrical conductivity, as shown in Fig. 13. Referring now to Fig. 13, a coating 67, preferably of metal such as copper, is plated over the entire surface of crystal 21. Coating 67 is made sufficiently thin so that it evaporates during the welding operation and is not present in the later steps of the method of the invention. For copper, a thickness of 0.0002" will meet this requirement.

In the embodiment of the invention thus far described, bead 16 is fused to wire 13 after the welding operation, in order to prevent cracking of or other damage to bead 16 when wire 13 is heated rapidly during the welding operation. In some instances it may be more desirable to fuse bead 16 to wire 13 prior to welding. Thus, if bead 16 is fused prior to the welding operation, the fusing may be obtained by conventional gas flames. Furthermore, mass production methods may be used to assemble bead-lead wire units, which may then be used for either the crystal assembly or the whisker assembly.

One method of preventing cracking of bead 16 during welding is to heat bead 16 either prior or during the welding operation. Thus, if the apparatus of Fig. 1 were used, shaft 11 would be lowered to the position shown in Fig. 1*c*, and bead 16 preheated by coil 24. The welding operation would then proceed in the manner illustrated in Figs. 1 and 1*a*. Obviously other forms and manners of preheating may be utilized without departing from the spirit and scope of this invention.

Figure 14:
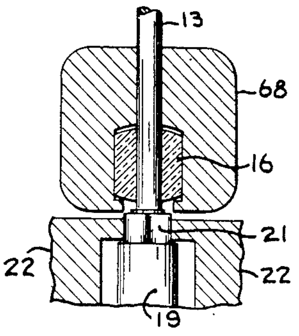
Fig. 14 illustrates a modification of the welding operation in which a glass bead is fused to the lead-wire prior to welding.

Another method of preventing cracking of bead 16 is to surround bead 16 with a heat dissipating element during the welding operation. One convenient apparatus for performing this function is illustrated in Fig. 14, wherein a heat dissipating member 68 of high heat capacity and of large volume surrounds bead 16. In this manner, when the welding current is applied through lead wire 13, a large percentage of the heat generated in wire 13 will be dissipated by member 68, and bead 16 will suffer little, if any, damage.

While the invention has been described in connection with crystal elements of block or cubic form, it is to be understood, of course, that crystal elements of other configurations are equally applicable. Thus, if cylindrical or disc-shaped crystal elements are utilized, it becomes necessary merely to alter the configurations of members 22 to fit the contour of these elements. Spherical crystal elements may be used in the disclosed methods, if members 22 are modified to fit the circular contour. However, when spherical crystal elements are utilized, the contact area between the crystal and lead wire during welding will be less than that existing between the lead wire and block crystal elements, and the problem of tapering lead wire 13 to produce a diminished area of contact will be less acute. No matter what particular configuration is given to the crystal element, it should be apparent, in view of the teachings of this invention, that the welding current can not flow through that portion of the surface of the element which is to be utilized for the rectifying contact. Accordingly, members 22 should be arranged about the surface of the crystal element so that the current flows into the crystal along one path, and out of the crystal along another path angularly related to the first path, the other path being within the crystal element. Stated differently, if it is assumed that the weld is to be made at a first portion of the surface of the crystal element and that a second portion of the surface of the element, spaced from the first portion, is to be used for the rectifying contact, then the welding current should pass out of the element at at least one portion of the element distinct from the first and second portions.

It is thus seen that the present invention provides a novel method and apparatus for welding a lead wire directly to a germanium semi-conductor crystal element. In addition, the invention discloses novel methods and apparatus for forming a complete germanium crystal device in which the crystal element is positioned within and spaced from a glass envelope, and a vitreous bond is provided between the envelope and each of the lead wires connected to the crystal element.

It is to be understood, of course, that the elements connected to the crystal element need not be "lead wires," as this term is understood in the art, but may be electrodes of any configuration. The electrode should be composed of metal having a melting point higher than that of the envelope, in order to insure proper bonding between the electrode and the envelope. In this manner, the weakest point in the structure, with respect to temperature, would be either cylinder 44 or the vitreous bond.

What is claimed as new is:

1. A germanium crystal device comprising a germanium crystal, first and second wire electrodes, a rectifying contact between said crystal and said first wire electrode, and a substantially non-rectifying welded connection between said crystal and said second electrode.

2. A rectifier comprising a germanium crystal, first and second electrodes, a rectifying contact between said crystal and said first electrode, and a welded joint between said crystal and said second electrode, the cross-sectional areas of said crystal and said second electrode being of the same order of magnitude, the over-all rectifying characteristic of the rectifier being substantially the same as that of said rectifying contact.

3. An electrical circuit element comprising: a germanium crystal device having a rectifying boundary, said device including a germanium crystal; and a metallic wire electrode welded to said crystal, the over-all rectifying characteristic of the circuit element being substantially the same as that of said rectifying boundary.

4. In a germanium crystal device, the combination comprising: a germanium crystal; a metallic electrode; and a symmetrically conductive welded joint between one end of said electrode and said crystal, said joint being formed by passing current through said one end and into said crystal along a first path, and out of said crystal along a second path angularly related to said first path, said second path being within said crystal.

5. A germanium crystal device comprising a germanium crystal, first and second metallic electrodes, an assymmetrically conductive connection between said crystal and said first electrode, and a welded connection between said crystal and said second electrode, the cross-sectional area of said welded connection being of the same order of magnitude as the cross-sectional area of said crystal, said welded connection being substantially symmetrically conductive as compared to the conductivity of said asymmetrically conductive connection.

6. In a germanium crystal device, a germanium crystal having a predetermined maximum cross-sectional area, a lead wire having one end, and a substantially non-rectifying welded joint between said one end and said crystal, the area of said welded joint being of the same order of magnitude as said maximum area.

7. In a germanium crystal device, a germanium crystal having a maximum cross-sectional area substantially equal to the area of a circle having a diameter of $m(10)^{-k}$ inch, a metallic electrode having one end, and a substantially non-rectifying welded joint between said one end and said crystal, the area of said welded joint being substantially equal to the area of a circle having a diameter of $n(10)^{-k}$ inch, $k$, $m$, and $n$ being decimal digits.

8. In a germanium crystal device, a germanium crystal having first and second faces, a metallic electrode, and a substantially non-rectifying welded connection between said electrode and said first face, said connection being formed by passing current through said first face into said crystal and out of said crystal at points spaced from said second face.

9. The article defined in claim 8, which further includes a glass envelope surrounding said crystal and a portion of said electrode adjacent said crystal, and a vitreous bond between said envelope and said portion of said electrode.

10. A germanium diode comprising a glass envelope having a pair of ends, a germanium crystal element positioned within said envelope, a first metallic electrode extending into said envelope through one of said pair of ends and contacting said element, a welded joint between said first electrode and said element, a second metallic electrode extending into said envelope through the other of said pair of ends, a rectifying connection between said second electrode and said crystal, and a vitreous bond between said envelope and a portion of each of said electrodes.

11. A diode as defined in claim 10, wherein the bond between said envelope and said first electrode is spaced from said welded joint.

12. The method of welding a metallic electrode to a crystal element, the electrode having one end in contact with the element, said method comprising passing current through the contact and into the element along a first path, and out of the element along a second path angularly related to said first path, said second path being within said element.

13. The method of welding a metallic electrode to a germanium crystal element, the element having first and second opposed faces, and a surface joining said faces, said method comprising the steps of positioning one end of the electrode in contact with said first face, and passing current through said contact into the element and out of the element through said surface.

14. The method of welding a metallic electrode in contact with a germanium crystal element to the element, wherein the area of the weld is of the same order of magnitude as the maximum cross-sectional area of the element, said method comprising passing current of between 23 and 30 amperese through the contact for a period of time of between one-half and one-third of a second.

15. The method of welding a metallic electrode to a germanium crystal element, wherein the maximum cross-sectional area of the element is of the order of 0.002 square inch and the cross-sectional area of the weld at the junction between the electrode and the element is of the same order of magnitude as the maximum cross-sectional area of the element, said method comprising passing current of between 23 and 30 amperes through said electrode and said element for a period of time less than one second.

16. In the method of producing a germanium crystal device, wherein the device includes a germanium crystal element, a first metallic electrode and an asymmetrically conductive connection between the first electrode and a first portion of the crystal element, the combination of steps for producing a substantially symmetrically conductive welded connection between a second metallic electrode and a second portion of the element spaced from the first portion, said combination comprising positioning one end of the second electrode in contact with the second portion of the element, and passing current through the contact into the element and out of the element at a point spaced from the first and second portions of the element.

17. The method of welding a metallic electrode to a germanium crystal element, said element having a first surface area to which the electrode is to be welded, a second surface area spaced from the first area, and a third surface area between the first and second areas, said method including the steps of pressing one end of said electrode against said first area, and passing a current through said first electrode and said first and third areas for welding said first electrode to said first area.

18. Apparatus for welding a lead wire to a germanium crystal element having a pair of faces and at least one pair of sides, said apparatus comprising electrical insulating means for supporting said crystal element on one of said faces, a pair of electrodes for contacting said one pair of sides of said crystal element, respectively, means for positioning one end of the lead wire in contact with the other of said pair of faces of said crystal element, a source of current, means for coupling said source between the other end of said lead wire and said electrodes to pass the current from said source through said lead wire, said other face, and said sides of said crystal element, and means for applying pressure to said lead wire to cause said lead wire to penetrate said crystal element.

19. Apparatus for welding a lead wire to a germanium crystal element having a pair of faces and at least one pair of sides, said apparatus comprising a pair of electrodes for contacting said one pair of sides of said crystal element, respectively, means for positioning one end of the lead wire in contact with one of said pair of faces of said crystal element, a source of current, and means for coupling said source between said lead wire and said electrodes to pass the current from said source through said lead wire, said one face, and said sides of said crystal element.

20. Apparatus for welding one end of a metallic electrode making contact with a germanium crystal element, the element having a plurality of sides, said apparatus comprising means for supplying current through the contact and through at least one side of said element, and means for applying pressure between said electrode and said element to cause said electrode to penetrate said element.

References Cited in the file of this patent

UNITED STATES PATENTS

| Number | Name | Date |
|---|---|---|
| 1,866,351 | Hollnagel et al. | July 5, 1932 |
| 2,024,585 | Laico | Dec. 17, 1935 |
| 2,116,387 | Driggs et al. | May 3, 1938 |
| 2,162,487 | Lotz | June 13, 1939 |
| 2,546,315 | Oakley | Mar. 27, 1951 |
| 2,609,428 | Law | Sept. 2, 1952 |
| 2,629,672 | Sparks | Feb. 24, 1953 |

FOREIGN PATENTS

| Number | Country | Date |
|---|---|---|
| 58,421 | Norway | Sept. 27, 1937 |
| 604,460 | Great Britain | July 5, 1948 |

OTHER REFERENCES

North, Journal of Applied Physics, vol. 17, Nov. 1946, pages 912–915.